United States Patent
Lee

(10) Patent No.: US 7,505,247 B2
(45) Date of Patent: Mar. 17, 2009

(54) MULTI-LAYER CERAMIC CAPACITOR AND PRODUCTION METHOD THEREOF

(75) Inventor: Kwi-Jong Lee, Seoul (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 272 days.

(21) Appl. No.: 11/345,409

(22) Filed: Feb. 2, 2006

(65) Prior Publication Data

US 2006/0221544 A1    Oct. 5, 2006

(30) Foreign Application Priority Data

Mar. 30, 2005    (KR)    ............... 10-2005-0026497

(51) Int. Cl.
*H01G 4/005* (2006.01)
*H01G 4/06* (2006.01)
(52) U.S. Cl. ...................... 361/303; 361/311
(58) Field of Classification Search ......... 361/303–305, 361/311
See application file for complete search history.

(56) References Cited

FOREIGN PATENT DOCUMENTS

| JP | 09260200 A | * | 10/1997 |
| JP | 2000277367 A | * | 10/2000 |
| JP | 2002329634 A | * | 11/2002 |
| JP | 2004072034 A | * | 3/2004 |

* cited by examiner

*Primary Examiner*—Eric Thomas
(74) *Attorney, Agent, or Firm*—Stanzione & Kim, LLP

(57) ABSTRACT

An example of a multi-layer ceramic capacitor may include multiple dielectric sheets. In a cross section of each dielectric sheet, there may be printed a first external electrode, a first internal electrode which includes one or more protrusions and which is joined to the first external electrode by way of an interposed dielectric portion, a second external electrode joined as a single body to the first internal electrode, and a second internal electrode joined to the first internal electrode with a dielectric portion positioned in a space defined by the protrusions. The dielectric sheets may be stacked alternately to be symmetrical, such that the first external electrodes and the second external electrodes are electrically connected and the protrusions of the first internal electrodes and the second internal electrodes are electrically connected. In this way, the areas of the internal electrodes can be maximized.

7 Claims, 9 Drawing Sheets

MULTI-LAYER CERAMIC CAPACITOR AND PRODUCTION METHOD THEREOF

CROSS-REFERENCE TO RELATED APPLICATIONS

This application claims the benefit of Korean Patent Application No. 2002-26497 filed with the Korea Industrial Property Office on Mar. 30, 2005, the disclosure of which is incorporated herein by reference.

BACKGROUND OF THE INVENTION

1. Field of the Invention

The present invention relates to an electronic component, and in particular to a multi-layer ceramic capacitor and a production method thereof.

2. Description of the Related Art

A capacitor is an electronic component that uses electrodes joined with a dielectric positioned in-between to perform various functions such as blocking DC signals, bypassing, and frequency resonance, etc., and a multi-layer ceramic capacitor (MLCC) is an electronic component formed by stacking several layers of capacitors. With the gradual expansion of the portable terminal market due to the personalization of electronic products, the multi-layer ceramic capacitor is becoming smaller and lighter. In prior art, the multi-layer ceramic capacitor is produced by a process of printing electrode paste on a green sheet, sintering at high temperatures after stacking in multiple layers and cutting, and then coating and sintering the external electrode for plating.

In general, methods of improving the electric capacity of a multi-layer ceramic capacitor include increasing the areas of the internal electrodes, using dielectrics with a high dielectric constant, reducing the thickness of the dielectrics, and increasing the number of layers. FIG. 1 illustrates internal electrodes 110 and dielectrics 120 as used in prior art. Here, the internal electrodes 110 and the dielectrics 120 are formed as planar structures. Therefore, to improve the electric capacity of a multi-layer ceramic capacitor having a predetermined thickness, the thickness of the dielectrics must be reduced, and the number of layers increased. However, there is a certain limit to how much the thickness of the dielectrics may be reduced. Thus, as electronic devices continue to be produced in smaller and smaller sizes, there is a growing need for improving electric capacity even with thin thicknesses by maximizing the areas of the internal electrodes.

SUMMARY OF THE INVENTION

The invention provides a multi-layer ceramic capacitor and a production method thereof which can maximize the areas of the internal electrodes.

Also, the invention provides a multi-layer ceramic capacitor and a production method thereof which can form the shape of internal electrodes freely by using an inkjet technique to print the dielectrics and electrodes simultaneously.

Additional aspects and advantages of the present general inventive concept will be set forth in part in the description which follows and, in part, will be obvious from the description, or may be learned by practice of the general inventive concept.

According to an aspect of the invention, a method of producing a multi-layer ceramic capacitor may be provided, comprising: (a) forming dielectric sheets, wherein a first external electrode, a first internal electrode comprising one or more protrusions and joined to the first external electrode, a second external electrode joined as a single body to the first internal electrode, and a second internal electrode joined to the first internal electrode with dielectrics positioned in spaces defined by the protrusions are printed on a cross section of the dielectric sheet, (b) stacking alternately the dielectric sheets to be symmetrical, so that the first external electrodes and the second external electrodes are electrically connected and the protrusions of the first internal electrodes and the second internal electrodes are electrically connected, and compressing, (c) cutting the stacked dielectric sheets, and (d) sintering the cut dielectric sheets.

According to another aspect of the invention, a multi-layer ceramic capacitor may be provided, comprising a plurality of dielectric sheets, wherein a first external electrode, a first internal electrode comprising one or more protrusions and joined to the first external electrode, a second external electrode joined as a single body to the first internal electrode, and a second internal electrode joined to the first internal electrode with dielectrics positioned in spaces defined by the protrusions are printed on a cross section of the dielectric sheet, and wherein the dielectric sheets are stacked alternately to be symmetrical, so that the first external electrodes and the second external electrodes are electrically connected and the protrusions of the first internal electrodes and the second internal electrodes are electrically connected. Here, the shape of the second internal electrode may be any one of a triangle, rectangle, or a hemisphere.

Also, the first external electrode, the dielectric, the first internal electrode, the second external electrode, and the second internal electrode are printed simultaneously by an inkjet technique, and the inkjet technique may be a technique of using a plurality of inkjet printer heads to spray ink intended for electrodes and ink intended for dielectrics.

Further, the dielectric, the protrusions of the first internal electrode, and the second internal electrode may be printed continuously on the same plane as the dielectric sheet.

Also, the protrusions of the first internal electrode and the second internal electrode may be separated by a predetermined gap and printed continually with the dielectric positioned in-between, on the same plane as the dielectric sheet.

Here, the protrusions of the first internal electrode and the second internal electrode may be separated by a predetermined gap and may face each other, between adjacent lines of the first internal electrodes on the same plane as the dielectric sheet.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
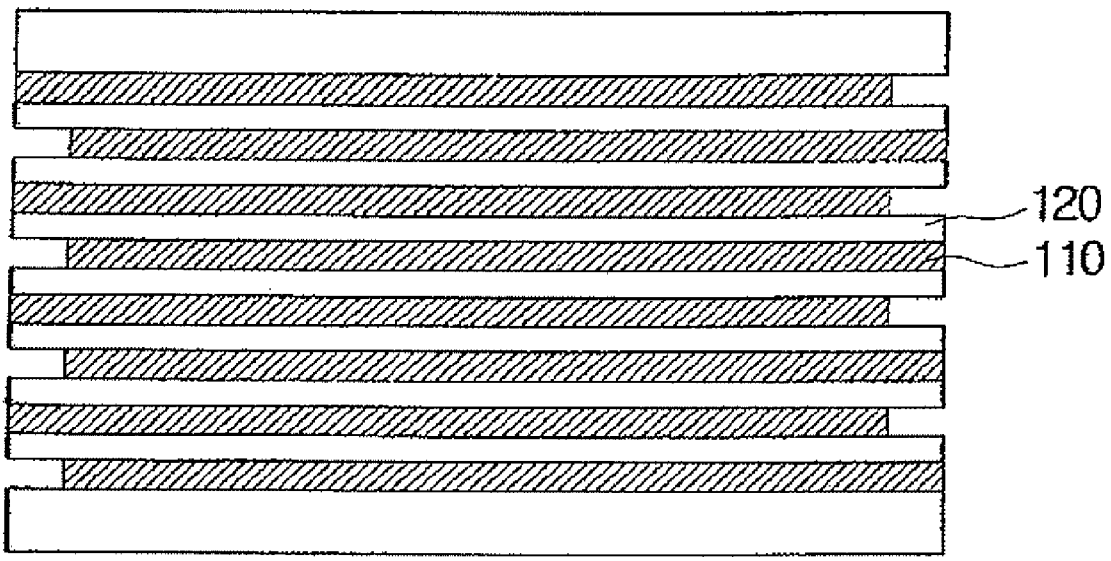
FIG. 1 is a cross sectional view illustrating internal electrodes in a multi-layer ceramic capacitor as used in prior art.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

The shape of electrodes described in the invention may be applied to single-layer and/or multi-layer ceramic capacitors, and will be explained with the focus on multi-layer ceramic capacitors. The basic principles of the multi-layer ceramic capacitor will first be described before discussing the preferred embodiments of the invention.

The multi-layer ceramic capacitor consists of a plurality of ceramic capacitors, each ceramic capacitor comprising a dielectric, an internal electrode, and an external electrode. The dielectric is the external body portion of the multi-layer ceramic capacitor, and since it is made of a ceramic material, it is generally called a ceramic body. In general, BaTiO3 (Barium Titanate, BT) is used as the dielectric, which has a high permittivity at normal temperature. The sintering temperature of BT powder used as the dielectric is about 1250° C.

The internal electrode is a conductive matter positioned within the dielectric. Palladium (Pd), nickel (Ni), and copper (Cu), etc. are generally used as the material for the internal electrode. The melting temperatures of palladium (Pd), nickel (Ni), and copper (Cu), the materials for the internal electrode, are 1555° C., 1452° C., and 1083° C., respectively.

The external electrode is a conductive matter which connects the array type multi-layer ceramic capacitor to an outside power source. As the array type multi-layer ceramic capacitor is an element designed to be mounted on the surface of a substrate, not only does the external electrode play the simple role of connecting to an outside power source, it aids the adhesion of solder when mounting onto the substrate.

Figure 2:
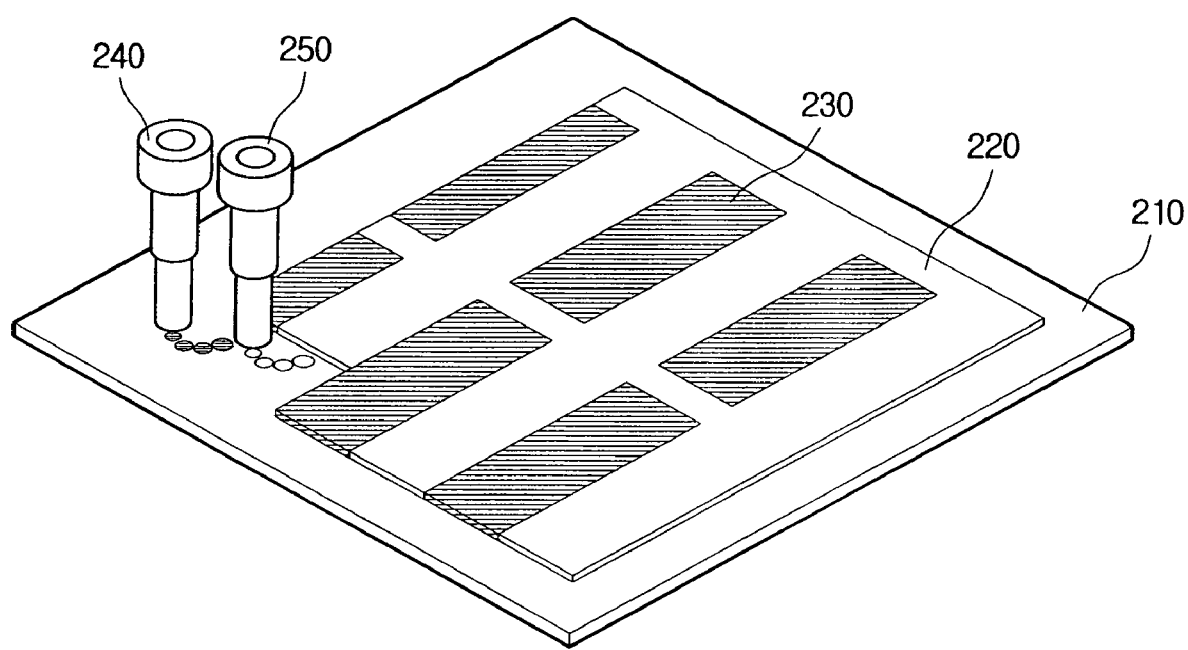
FIG. 2 illustrates a method of printing dielectrics and electrodes simultaneously by an inkjet technique according to a preferred embodiment of the invention.

FIG. 2 illustrates a method of printing dielectrics and electrodes simultaneously by an inkjet technique using a plurality of inkjet printer heads according to a preferred embodiment of the invention.

As seen in FIG. 2, an inkjet printer head 240 intended for electrodes and an inkjet printer head 250 intended for dielectrics form the electrodes 230 and the dielectric 220, respectively, on the carrier film 210.

The inkjet printer head 240 intended for electrodes and the inkjet printer head 250 intended for dielectrics spray ink intended for electrodes and ink intended for dielectrics, respectively. The ink for electrodes may contain metal powder such as palladium (Pd), nickel (Ni), copper (Cu), tungsten (W), and molybdenum (Mo), binders, and solvents, and the ink for dielectrics may contain BT powder, binders, and solvents. Here, when printing the ink intended for electrodes and ink intended for dielectrics simultaneously, immiscible solvents may be used so that two are not mixed with each other.

The simultaneous printing of the dielectric 220 and the electrodes 230 by an inkjet technique described herein refers not only to the spraying of the ink intended for electrodes and ink intended for dielectrics during the same time period, but also to using a plurality of inkjet printer heads to print the dielectric 220 and the electrodes 230 according to a preconfigured program and pattern. Therefore, the dielectric 220 and the electrodes 230 may be printed together or printed in the same path. For example, in FIG. 2, the inkjet printer head 240 for electrodes and the inkjet printer head 250 for dielectrics move synchronously facing the carrier film 210 and print the electrodes 230 and the dielectric 220 simultaneously. Here, the inkjet printer head 240 for electrodes halts its operation at parts where only the dielectric 220 is printed, and only the inkjet printer head 250 for dielectrics sprays the ink for dielectrics.

The inkjet printer head 240 for electrodes and the inkjet printer head 250 for dielectrics may be heads in an inkjet printer device for spraying ink. For example, an inkjet printer device may comprise a support which holds the device, an inkjet printer head which sprays ink to print the electrodes and the dielectric on a carrier film 210 according to a preconfigured pattern, a moving device which moves the inkjet printer head over the carrier film 210, and a circuit part which executes a program controlling the inkjet printer head to spray ink according to a preconfigured pattern, etc.

Here, the inkjet printer head 240 for electrodes and the inkjet printer head 250 for dielectrics may spray ink while moving synchronously. In other words, they may print the electrodes and the dielectric while moving together on the same path according to a preconfigured pattern. When the heads are moved together, the electrodes and the dielectric may be printed according to a preconfigured pattern by controlling the starting point, and amount, etc. of the ink sprayed for each head. In another embodiment, the inkjet printer head 240 for electrodes and the inkjet printer head 250 for dielectrics may spray ink while moving separately in correspondence to different operational control signals. In other words, each head may be mounted on a device or separate devices, each receiving different operational control signals from different programs and performing corresponding operations thereto.

Figure 3:
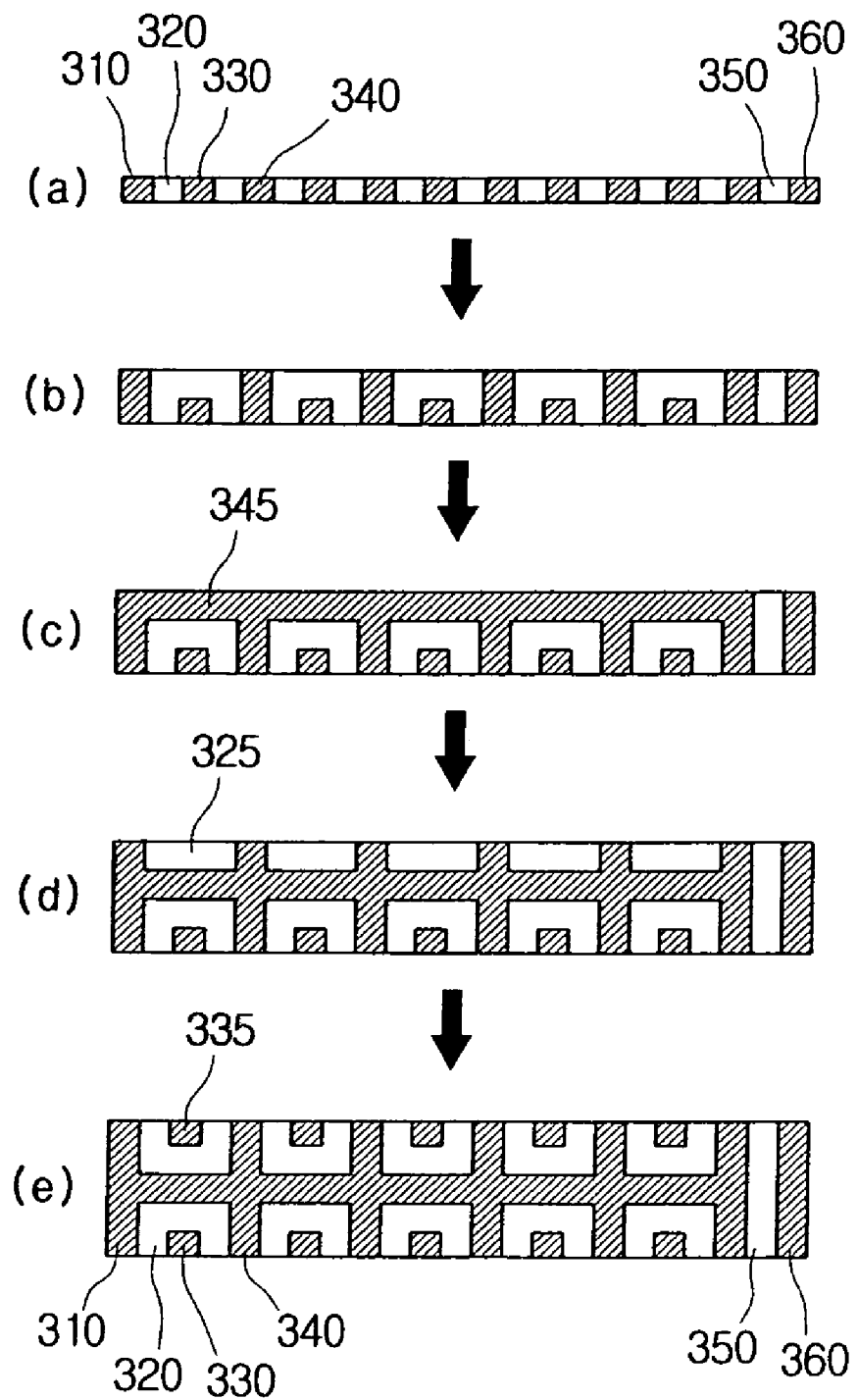
FIG. 3 illustrates a pattern for printing a dielectric sheet according to a preferred embodiment of the invention.

FIG. 3 illustrates a pattern for printing a dielectric sheet, which is a part of the multi- layer ceramic capacitor, by an inkjet technique using a plurality of inkjet printer heads according to a preferred embodiment of the invention. In FIG. 3, the arrows indicate the order in which the electrodes and dielectrics are printed simultaneously and stacked.

In step (a), the electrodes and dielectrics are printed alternately. That is, the first external electrode 360, the dielectric 350, the plurality of protrusions 340 of the first internal electrode, the plurality of second internal electrodes 330, the plurality of dielectrics 320 formed in spaces defined by the protrusions 340 of the first internal electrode, and the second external electrode 310 are printed. Although the shape of the second internal electrodes 330 have been illustrated here as rectangles, it may take the form of a triangle or hemisphere.

In step (b), the printing continues similarly to the printing in step (a), except that the dielectrics are printed on the upper parts of the second internal electrodes 330 to insulate the first internal electrode and the second internal electrodes 330. The body portion 345 of the first internal electrode is printed in step (c), and in step (d), printing continues so that the pattern is symmetrical about the body portion 345 of the first internal electrode. In step (e), a dielectric sheet is formed by printing another set of second internal electrodes 335 and dielectrics.

The print pattern described here is formed for each layer, so that they may be printed by an inkjet technique using a plurality of inkjet printer heads, or may be printed such techniques as gravure printing and screen printing. Hereafter, the description will focus on printing by an inkjet technique using a plurality of inkjet printer heads.

Although the pattern for internal electrodes set forth above focused mainly on embodiments applied to multi-layer ceramic capacitors, such patterns may also be applied to single-layer to single ceramic capacitors. That is, by using electrodes such as those with an embossed composition, a single-layer capacitor comprising two electrodes on which a plurality of protrusions are formed on a plane, where the protrusions are joined to the protrusions of the other electrode, facing each other and having a dielectric positioned in-between, can be made so that the area formed between electrodes may be maximized by the protrusions. In this case, the recently developed embedded single-layer capacitor could minimize thickness while maximizing the area between electrodes.

Figure 4:
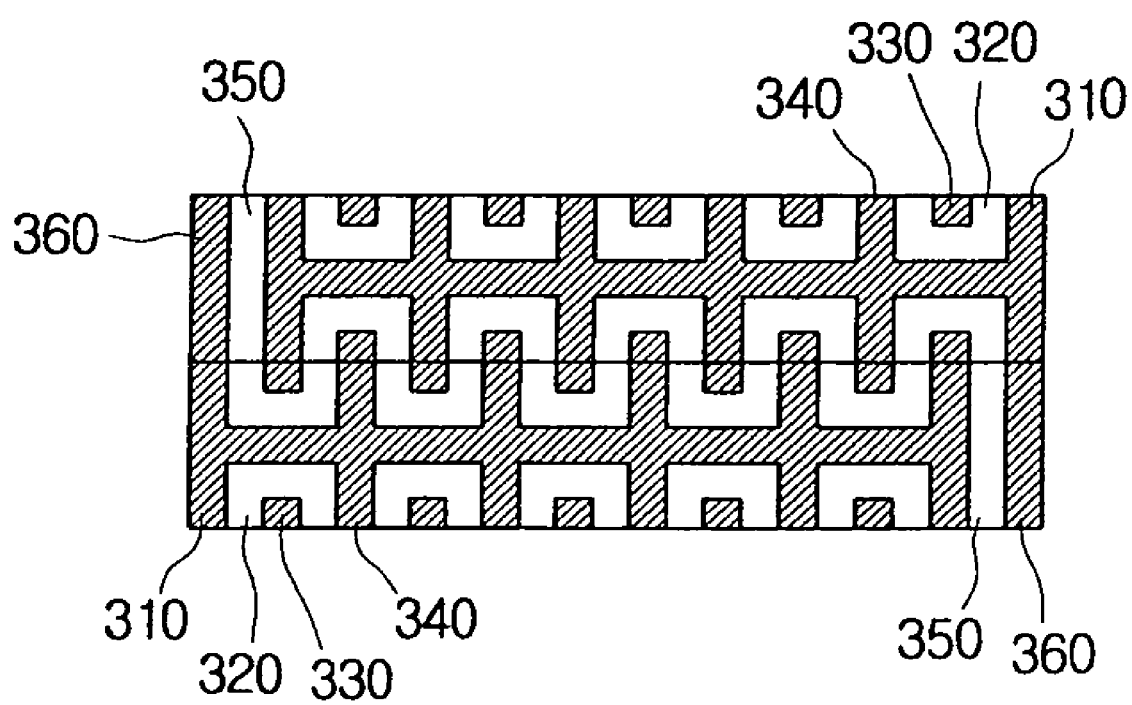
FIG. 4 illustrates symmetrical stacking for a multi-layer ceramic capacitor according to a preferred embodiment of the invention.

FIG. 4 illustrates symmetrical stacking for a multi-layer ceramic capacitor according to a preferred embodiment of the invention.

Here, a multi-layer ceramic capacitor is formed when the dielectric sheets on which the electrodes and dielectrics are printed simultaneously are stacked alternately after rotating by 180° so that they are symmetrical. In other words, a multi-layer ceramic capacitor is formed by rotating dielectric sheets about an axis passing the center of the dielectric and then stacking the dielectric sheets in predetermined numbers so that the second external electrode 310 of the lower dielectric sheet and the first external electrode 360 of the upper dielectric sheet are superposed and the second internal electrodes 330 of the lower dielectric sheet and the first internal electrode 340 of the upper dielectric sheet are superposed.

Therefore, since the second external electrode 310 of the lower dielectric sheet and the first external electrode 360 of the upper dielectric sheet are superposed, there is no contact problem between the internal electrodes and the external electrodes. Also, since the second internal electrodes 330 of the lower dielectric sheet and the first internal electrode 340 of the upper dielectric sheet are superposed, the protrusions formed by the internal electrodes mesh between the upper internal electrode and the lower internal electrode. Thus, according to the invention, the areas between internal electrodes are increased, compared to the case of planar internal electrodes as used in prior art, to the effect that the electric capacity of the multi-layer ceramic capacitor is increased. Here, the dielectrics of the lower dielectric sheet and the dielectrics of the upper dielectric sheet are in contact with each other, acting as interlayer dielectrics for the multi-layer ceramic capacitor.

Figure 5:
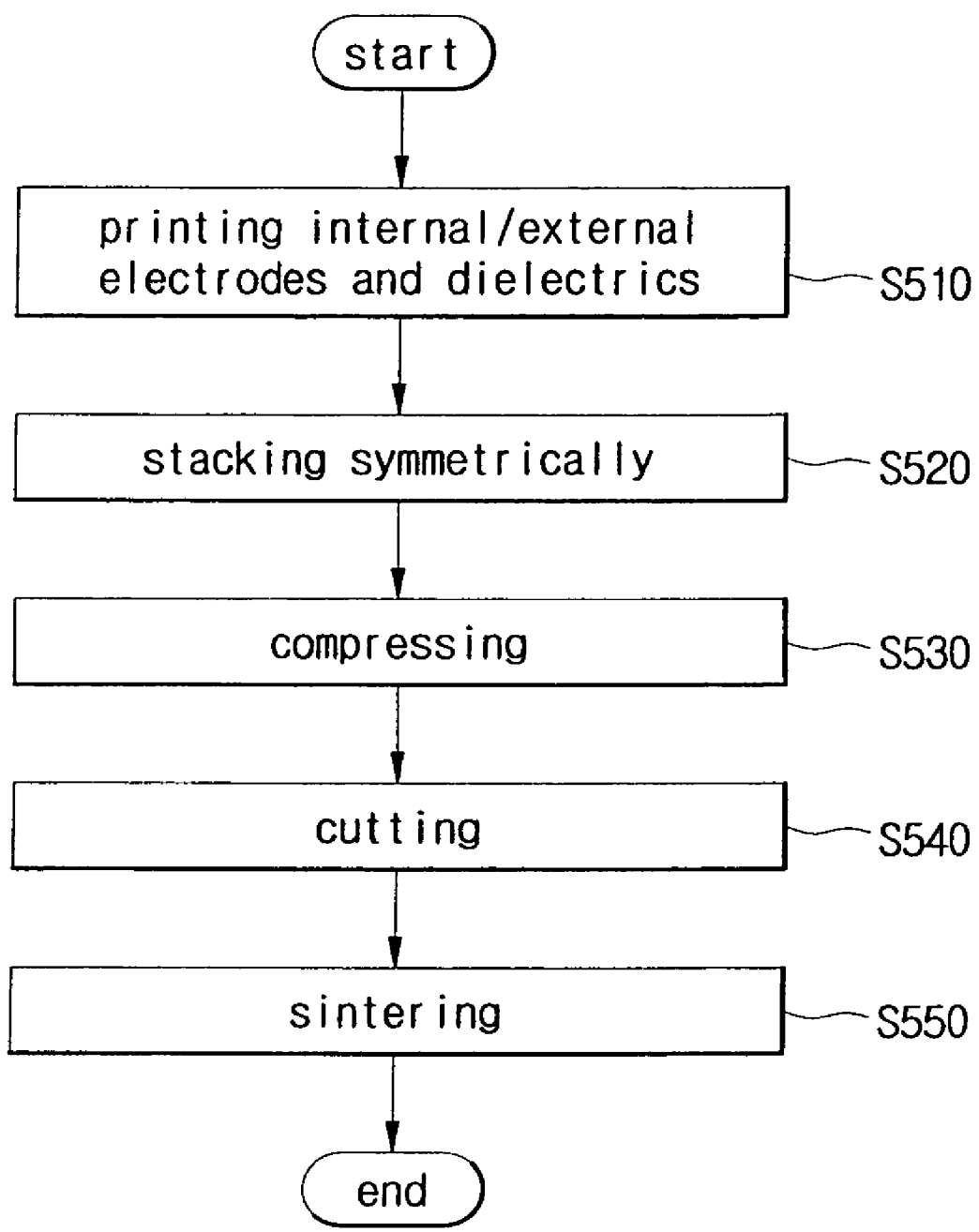
FIG. 5 illustrates a production method of a multi-layer ceramic capacitor according to a preferred embodiment of the invention.

FIG. 5 illustrates a production method of a multi-layer ceramic capacitor according to a preferred embodiment of the invention.

In step S510, the first external electrodes 360, the dielectrics 350, the first internal electrodes comprising the plurality of protrusions 340, the plurality of second internal electrodes 330, the plurality of dielectrics 320 formed in the space defined by the protrusions 340 of the first internal electrodes, and the second external electrodes 310 are printed using the inkjet printer head 240 for electrodes and the inkjet printer head 250 for dielectrics according to a preconfigured pattern.

The dielectric sheets, on each of which the first external electrodes 360, the dielectrics 350, the first internal electrodes comprising the plurality of protrusions 340, the plurality of second internal electrodes 330, the plurality of dielectrics 320 formed in the space defined by the protrusions 340 of the first internal electrodes, and the second external electrodes 310 are printed, are stacked alternately and symmetrically in a predetermined number in step S520, compressed in step S530, and then cut into chips in step S540. Afterwards, the chips thus formed are sintered in step S1450, and a plating process is applied to produce the multi-layer ceramic capacitors in units of chips.

The foregoing description explained figures that illustrate a multi-layer ceramic capacitor and production method thereof in general, and hereafter, the multi-layer ceramic capacitor and production method thereof according to the invention will be explained focusing on specific embodiments and with reference to the accompanying drawings. Two major embodiments of the invention are provided: the first relating to a method of continuously printing internal electrodes on the same plane as the dielectric sheets, and the second relating to a method of continually printing internal electrodes with a predetermined gap and with the dielectric positioned in-between on the same plane as the dielectric sheet. The two embodiments will be described hereafter in order.

Figure 6:
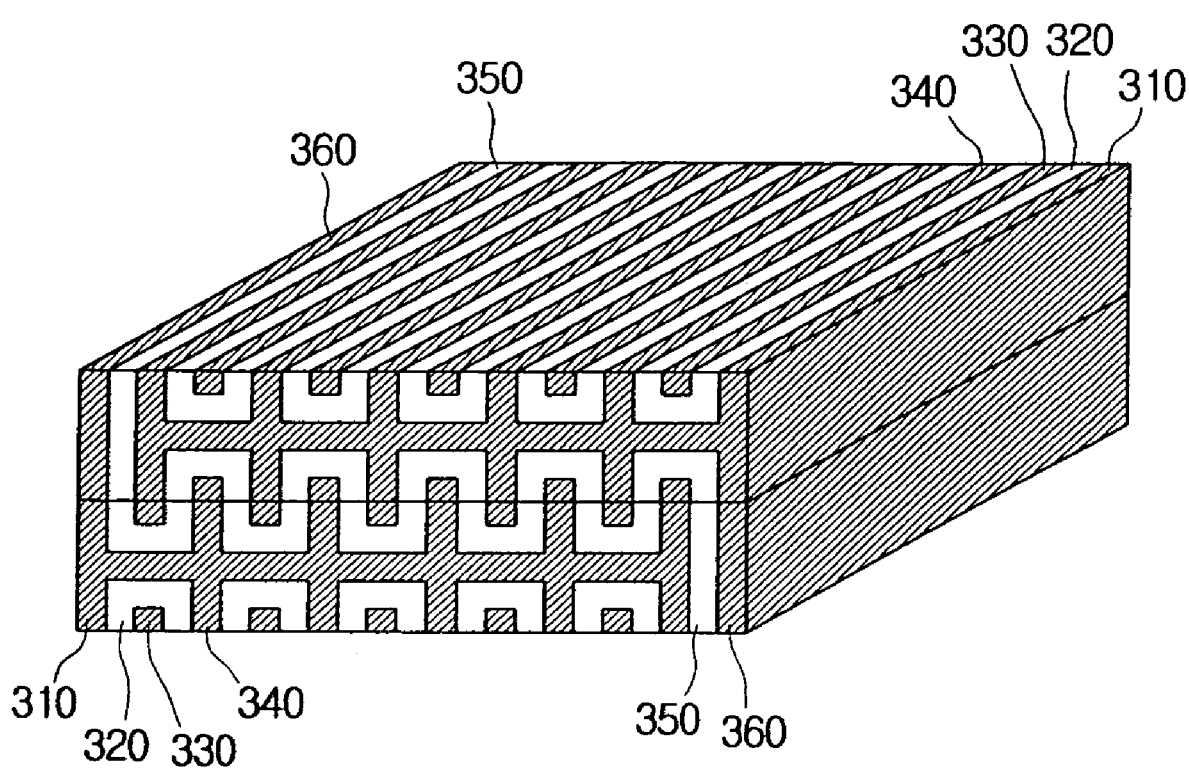
FIG. 6 is a perspective view of a cut multi-layer ceramic capacitor according to a first preferred embodiment of the invention.
Figure 7:
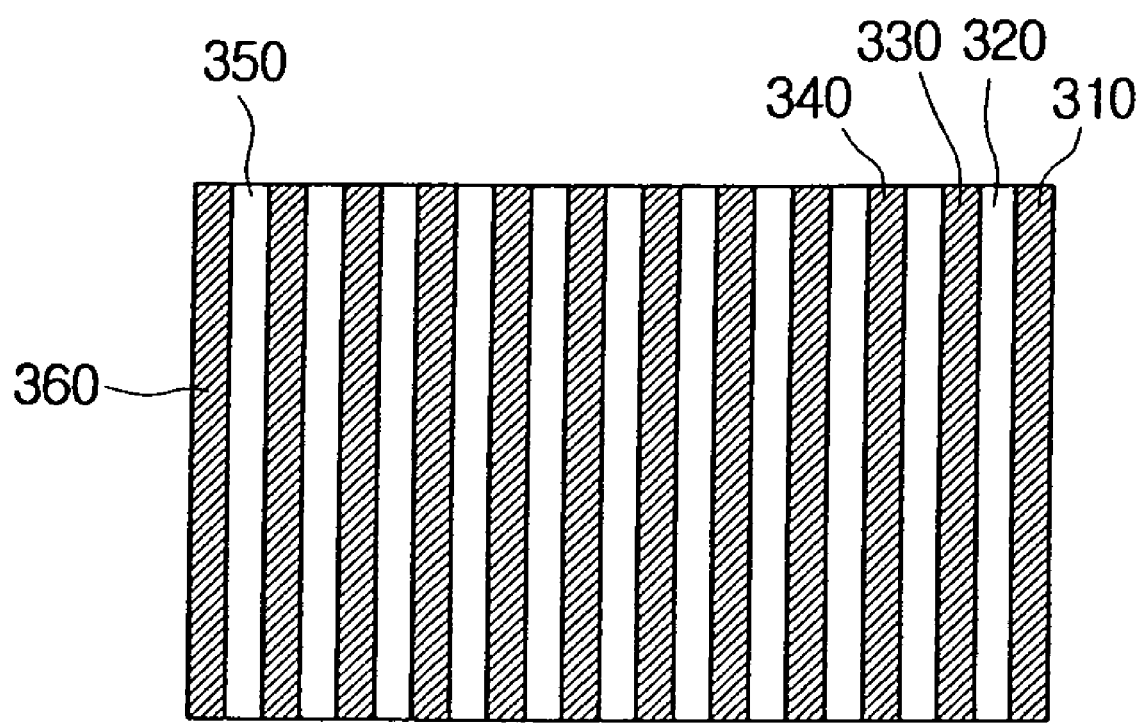
FIG. 7 is a cross sectional view of a multi-layer ceramic capacitor according to the first preferred embodiment of the invention, as seen from above.

FIG. 6 is a perspective view of a cut multi-layer ceramic capacitor according to a first preferred embodiment of the invention wherein the dielectrics, the protrusions of the first internal electrodes, and the second internal electrodes are printed continuously on the same plane as the dielectric sheet, respectively, and FIG. 7 is a cross sectional view of a multi-layer ceramic capacitor according to the first preferred embodiment of the invention, as seen from above.

In FIG. 6 is illustrated a composition with two dielectric sheets stacked symmetrically. Here, the first external electrodes 360, the dielectrics 350, the plurality of protrusions 340 of the first internal electrode, the plurality of second internal electrodes 330, the plurality of dielectrics 320 formed in spaces defined by the protrusions 340 of the first internal electrode, and the second external electrodes 310 are all printed continuously on the plane of the dielectric sheet. Thus, when the dielectric sheets are stacked alternately to be symmetrical, a composition for the multi-layer ceramic capacitor is formed wherein the internal electrodes are meshed with each other. Since the shape of the second internal electrodes 330 seen in the previous cross sections is a rectangle, the distance to the protrusions 340 of the first internal electrode is kept constant. Therefore, when power is connected to the protrusions 340 of the first internal electrode and the second internal electrodes 330, a constant charge distribution may be achieved. In another embodiment, the shape of the second internal electrodes 330 may be a triangle, or a hemisphere, etc.

As seen in FIG. 7, in a cross section formed identical to the upper face of the dielectric sheet, the protrusions 340 of the first internal electrode and the second internal electrodes 330 are continuously printed and alternately aligned.

Figure 8:
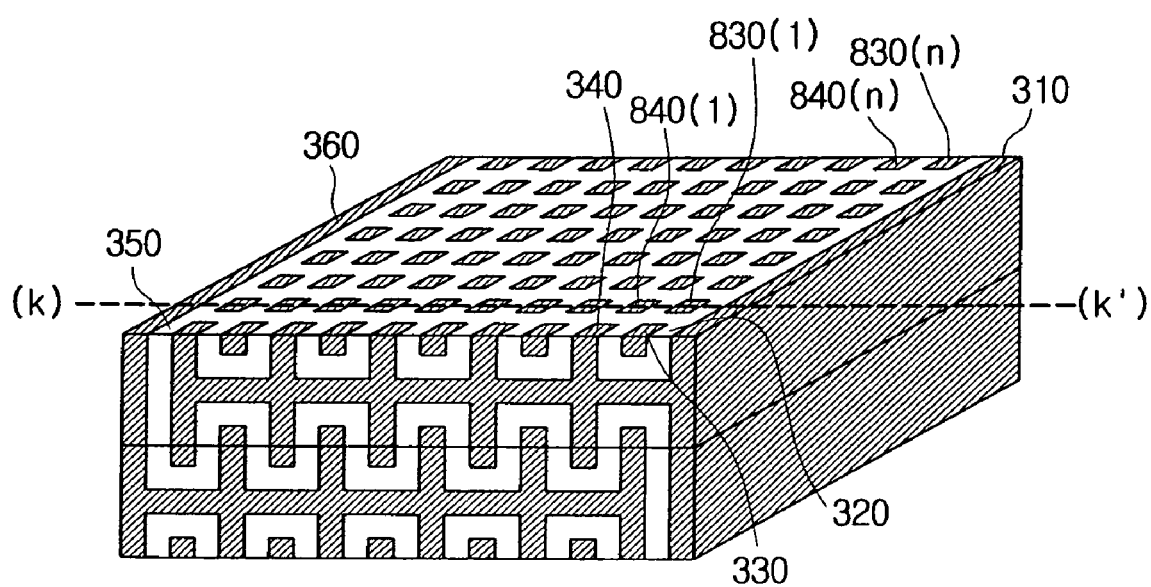
FIG. 8 is a perspective view of a cut multi-layer ceramic capacitor according to a second preferred embodiment of the invention.
Figure 9:
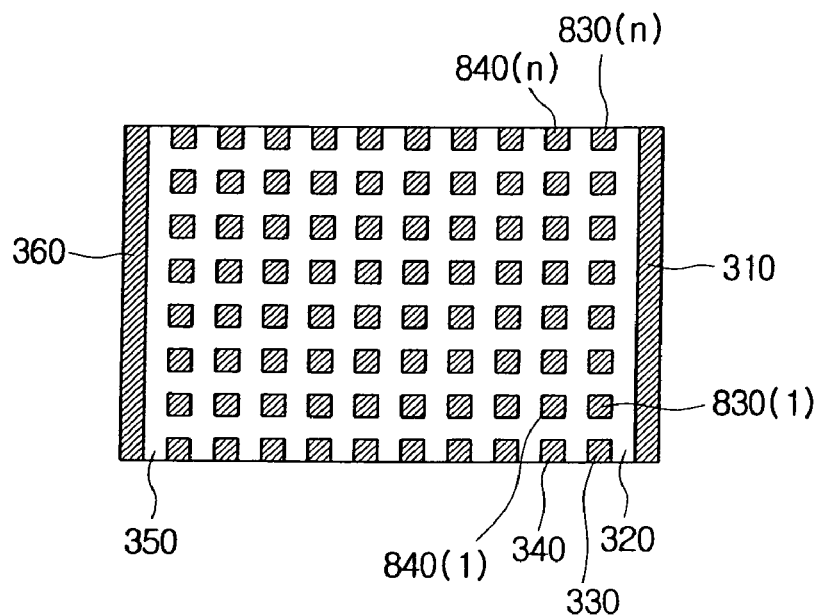
FIG. 9 is a cross sectional view of a multi-layer ceramic capacitor according to the second preferred embodiment of the invention, as seen from above.

FIG. 8 is a perspective view of a cut multi-layer ceramic capacitor according to a second preferred embodiment of the invention, wherein the protrusions of the first internal electrode and the second internal electrodes are printed on the same plane as the dielectric sheet, respectively, with the with the dielectric positioned in-between, and FIG. 9 is a cross sectional view of a multi-layer ceramic capacitor according to the second preferred embodiment of the invention, as seen from above.

Here, all of the electrodes on a line connecting the first internal electrode 340 and an adjacent electrode 840(1) may be first internal electrodes 340, or the first internal electrodes 340 and the second internal electrodes may be printed alternately on this line. The former case entails the advantage that the printing process is easier, as the print patterns are all alike, and the latter case entails the advantage that the areas of the electrodes facing each other is increased, as the composition involves one second internal electrode surrounded by four first internal electrodes. Hereafter, the description will focus on the latter case.

FIGS. 8 and 9 show that for the line of the plurality of protrusions 340 of the first internal electrode joined perpendicularly to the second external electrode (i.e. the line connecting the first internal electrode 340 and the second internal electrodes 330) and for the adjacent line of the plurality of protrusions of another first internal electrode formed on the same plane as the dielectric sheet (i.e. the line connecting a first internal electrode 830(1) and second internal electrodes 840(1)), the first internal electrode of one line face the second internal electrodes of the other line, with a predetermined gap and with a dielectric positioned in-between.

Figure 10:
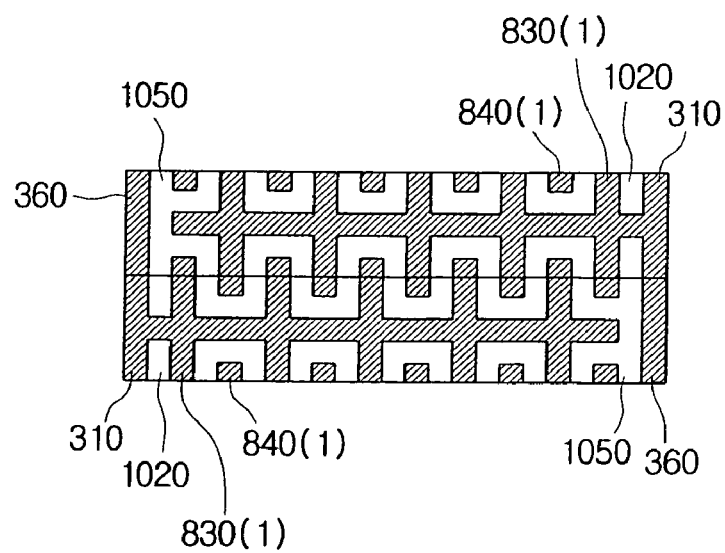
FIG. 10 is a cross sectional view across line kk' of FIG. 8.

FIG. 10 is a cross sectional view across line kk' of FIG. 8. As shown in FIG. 10, the overall print pattern is similar to that of the front cross section illustrated in FIG. 8, except that the arrangement of the first internal electrodes 830(1) and the second internal electrodes 840(1) are different. Thus, the dielectric 1050 joined to the first external electrode 360 and the dielectric 1020 joined to the second external electrode 310 are made different in correspondence to the pattern of the electrodes.

The invention is not limited to the foregoing embodiments, and the skilled person will understand that numerous variations may be made without departing from the spirit of the invention.

As set forth above, the multi-layer ceramic capacitor and production method thereof according to the invention can maximize the areas of the internal electrodes.

Also, the multi-layer ceramic capacitor and production method thereof according to the invention can form the shape of internal electrodes freely by using an inkjet technique to print the dielectrics and electrodes simultaneously.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A multi-layer ceramic capacitor, comprising a plurality of dielectric sheets, wherein each dielectric sheet comprises a first external electrode, a first internal electrode, a second external electrode, and a second internal electrode printed on a cross section thereof, the first internal electrode comprising one or more protrusions and joined to the first external electrode by way of an interposed dielectric portion, the second external electrode joined as a single body to the first internal electrode, and the second internal electrode joined to the first internal electrode by way of an interposed dielectric portion positioned in a space defined by the protrusions, and wherein the dielectric sheets are stacked alternately in a symmetrical manner, such that, for two adjacently stacked dielectric sheets, the first external electrode of one of the two dielectric sheets is electrically connected with the second external electrode of the other of the two dielectric sheets, and the protrusions of the first internal electrode of one of the two dielectric sheets are electrically connected with the second internal electrodes of the other of the two dielectric sheets.

2. The multi-layer ceramic capacitor of claim 1, wherein the shape of the second internal electrode is any one of a triangle, rectangle, or a hemisphere.

3. The multi-layer ceramic capacitor of claim 1, wherein the first external electrode, the dielectric portions, the first internal electrode, the second external electrode, and the second internal electrode are printed simultaneously by an inkjet technique.

4. The multi-layer ceramic capacitor of claim 3, wherein the inkjet technique is a technique of using a plurality of inkjet printer heads to spray ink intended for the electrodes and ink intended for dielectric portions.

5. The multi-layer ceramic capacitor of claim 1, wherein the dielectric portions, the protrusions of the first internal electrode, and the second internal electrode are printed continuously in the same plane for each of the dielectric sheets.

6. The multi-layer ceramic capacitor of claim 1, wherein the protrusions of the first internal electrode and the second internal electrode are separated by a predetermined gap and printed continually with the dielectric portion positioned in-between, in the same plane for each of the dielectric sheets.

7. The multi-layer ceramic capacitor of claim 6, wherein the protrusions of the first internal electrodes and the second internal electrodes in adjacent lines of the first internal electrodes face each other and are separated by the predetermined gap, in the same plane for each of the dielectric sheets.

* * * * *